(12) United States Patent
Carrington (10) Patent No.: US 9,945,301 B2
(45) Date of Patent: Apr. 17, 2018

(54) SYSTEM AND METHOD FOR COORDINATING A PROPELLER WITH AN ELECTRONIC ENGINE CONTROL

(71) Applicant: GE AVIATION SYSTEMS LLC, Grand Rapids, MI (US)

(72) Inventor: Christopher Roy Carrington, Gloucester (GB)

(73) Assignee: GE Aviation Systems, LLC, Grand Rapids, MI (US)

( * ) Notice: Subject to any disclaimer, the term of this patent is extended or adjusted under 35 U.S.C. 154(b) by 0 days.

(21) Appl. No.: 15/434,085

(22) Filed: Feb. 16, 2017

(65) Prior Publication Data

US 2017/0248085 A1 Aug. 31, 2017

(30) Foreign Application Priority Data

Feb. 29, 2016 (GB) .................................. 1603447.2

(51) Int. Cl.
*F02D 29/02* (2006.01)
*B64C 11/00* (2006.01)
*B64C 11/30* (2006.01)
*F02B 61/04* (2006.01)

(52) U.S. Cl.
CPC .............. *F02D 29/02* (2013.01); *B64C 11/00* (2013.01); *B64C 11/30* (2013.01); *F02B 61/04* (2013.01)

(58) Field of Classification Search
CPC ......... F02D 29/02; B64C 11/00; B64C 11/30; F02B 61/04
See application file for complete search history.

(56) References Cited

U.S. PATENT DOCUMENTS

| 4,531,408 A | 7/1985 | Chadwick et al. |
| 4,900,280 A | 2/1990 | Midttun |
| 5,186,608 A | 2/1993 | Bagge |
| 5,706,649 A | 1/1998 | Robinson et al. |
| 6,422,816 B1 | 7/2002 | Danielson |
| 6,672,835 B1 * | 1/2004 | Hughes ................. B64C 11/301 416/155 |
| 6,811,367 B2 * | 11/2004 | Ellis ..................... A01D 87/122 414/111 |
| 8,167,553 B2 * | 5/2012 | Perkinson ............... B64C 11/36 416/1 |

(Continued)

FOREIGN PATENT DOCUMENTS

| EP | 0 663 337 A1 | 7/1995 |
| GB | 2 260 821 A | 4/1993 |

(Continued)

OTHER PUBLICATIONS

Combined Search and Examination Report issued in connection with corresponding GB Application No. 1603447.2 dated Aug. 8, 2016.

*Primary Examiner* — Richard M Camby
(74) *Attorney, Agent, or Firm* — General Electric Company; William Scott Andes (57) ABSTRACT

A method and system are provided for coordinating a propeller with a controller module including a machine having a controller module and a propeller mounted to a propeller shaft at a hub. The shaft is arranged to be received in the machine, and a sensor is mounted to the machine, connected to the electronic controller module, and configured to sense the propeller when the propeller shaft is received in the machine.

20 Claims, 4 Drawing Sheets

(56) References Cited

U.S. PATENT DOCUMENTS 8,262,352 B2 * 9/2012 Gainford ............... B64C 11/306
                 416/1
2014/0054476 A1 2/2014 Zheng et al.

FOREIGN PATENT DOCUMENTS

| GB | 2 286 666 A | 8/1995 |
|----|-------------|--------|
| WO | 2014/202824 A1 | 12/2014 |

* cited by examiner

SYSTEM AND METHOD FOR COORDINATING A PROPELLER WITH AN ELECTRONIC ENGINE CONTROL

BACKGROUND

Contemporary turbo-prop engine aircraft can include one or more propellers attached to engines of the aircraft. Aircraft engines can be configured to receive and operate more than one propeller type. An engine controller system can be configured to operate the aircraft engine based on the propeller type installed, and can be adjusted to utilize the specific propeller characteristics of the selected propeller type.

BRIEF DESCRIPTION

In one aspect, a system for coordinating a propeller with an electronic engine controller module includes an engine having an electronic engine controller module, a propeller mounted to a propeller shaft at a hub, wherein the propeller shaft is arranged to be received in the engine, and a sensor mounted to the engine, connected to the electronic engine controller module, and configured to sense at least one unique parameter of the propeller and to send a signal representative of the at least one unique parameter to the electronic engine controller module when the propeller shaft is received in the engine and the propeller is rotated by the engine. The electronic engine controller module is configured to identify the propeller and adjust performance of the engine to the propeller based on the signal.

In another aspect, a method for coordinating a propeller with an electronic engine controller module includes receiving, by an engine, a propeller mounted to a propeller shaft at a hub and having a unique parameter of at least one of the propeller shaft or hub, operating the engine in a calibration mode, during the operating, sensing, by a sensor mounted to the engine, the unique parameter of the at least one of the propeller shaft or hub, identifying, by the engine controller module, the propeller based on the sensing of the unique parameter, and adjusting at least one performance characteristic of the engine. The adjusting the at least one performance characteristic of the engine coordinates the propeller with the engine.

In yet another aspect, an machine includes an electronic controller module, a propeller mounted to a propeller shaft at a hub, with the propeller shaft received in the machine, and a sensor mounted to the machine, connected to the electronic controller module, and configured to sense at least one unique parameter of the propeller and to send a signal representative of the at least one unique parameter to the electronic controller module when the propeller shaft is rotated relative to the machine. The electronic controller module is configured to identify the propeller and adjust performance of the machine to the propeller based on the signal.

DETAILED DESCRIPTION

The various aspects described herein are related to installing a propeller assembly in an engine or configuring an aircraft, an aircraft engine, or an engine controller module to adjust the performance of the aircraft engine based on the propeller assembly. Embodiments of the disclosure can be implemented in any environment, apparatus, or method for installing, adjusting, selecting or maintaining a propeller assembly, regardless of the function performed by the propeller assembly. By way of non-limiting example, such propeller assemblies can be utilized on aircraft, watercraft, wind turbines, and the like. Thus, the remainder of this applications focuses on such an environment.

Figure 1:
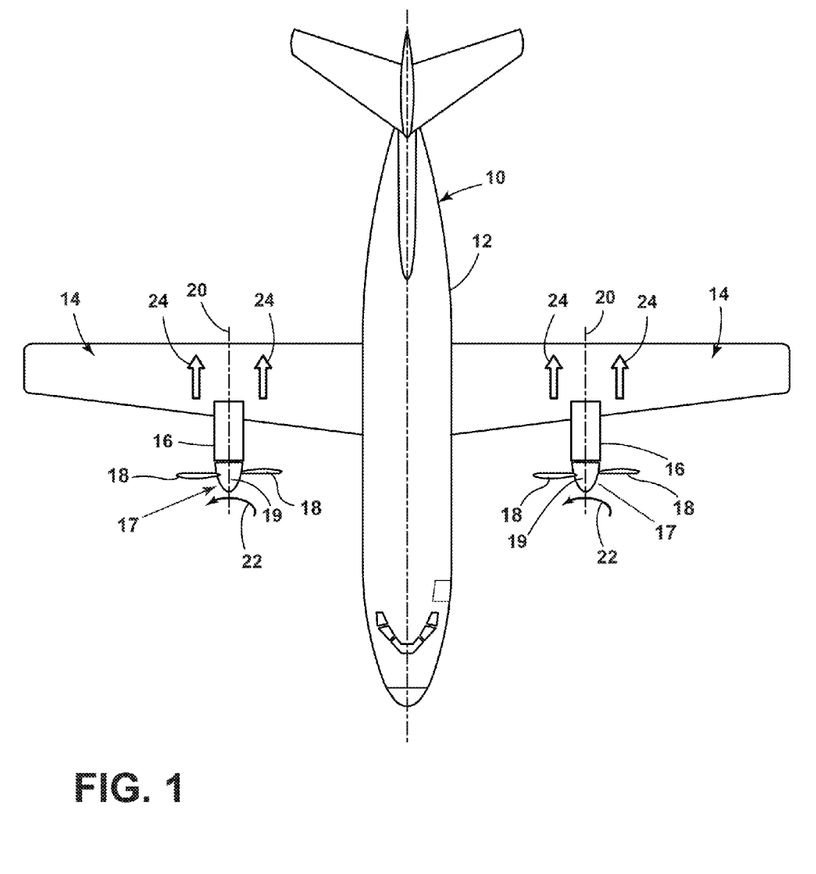
FIG. 1 illustrates an example schematic top view of an aircraft having wings, engines, and propellers in accordance with various aspects described herein.

FIG. 1 depicts an aircraft 10 having a fuselage 12 and wings 14 extending outward from the fuselage 12. The aircraft 10 can include at least one turbo-prop aircraft engine 16 coupled to the aircraft 10, shown as a set of engines 16 coupled with the opposing wings 14. The engine 16 can include a set of propeller assemblies 17 coupled with the engine 16, and including propeller blades 18 and a rotatable hub assembly 19. The engine 16 drives the rotation 22 of the propeller assembly 17 about a propeller assembly axis of rotation 20. The propeller blades 18 can further be configured or angled relative to the propeller assembly axis of rotation 20 such that the rotation 22 of the propeller blades 18 generates thrust (illustrated as arrow 24) for the aircraft 10. While an aircraft 10 having two turbo-prop engines 16 has been illustrated, embodiments of the disclosure can include any number of engines 16, propeller assemblies 17, or propeller blades 18, or any placement of the engine 16, assemblies 17, or blades 18 relative to the aircraft. Embodiments of the disclosure can further be applied to different aircraft engine 16 types, including, but not limited to, piston-based combustion engines, or electrically-driven engines. Additionally, the rotation 22 of the propeller assemblies 17 or propeller blades 18 is provided for understanding of the embodiments of the disclosure. Embodiments of the disclosure can include alternative directions of rotation 22 of the propeller assemblies 17 or propeller blades 18, or embodiments wherein a set of engines 16 rotate propeller blades 18 in the same or opposing directions.

Figure 2:
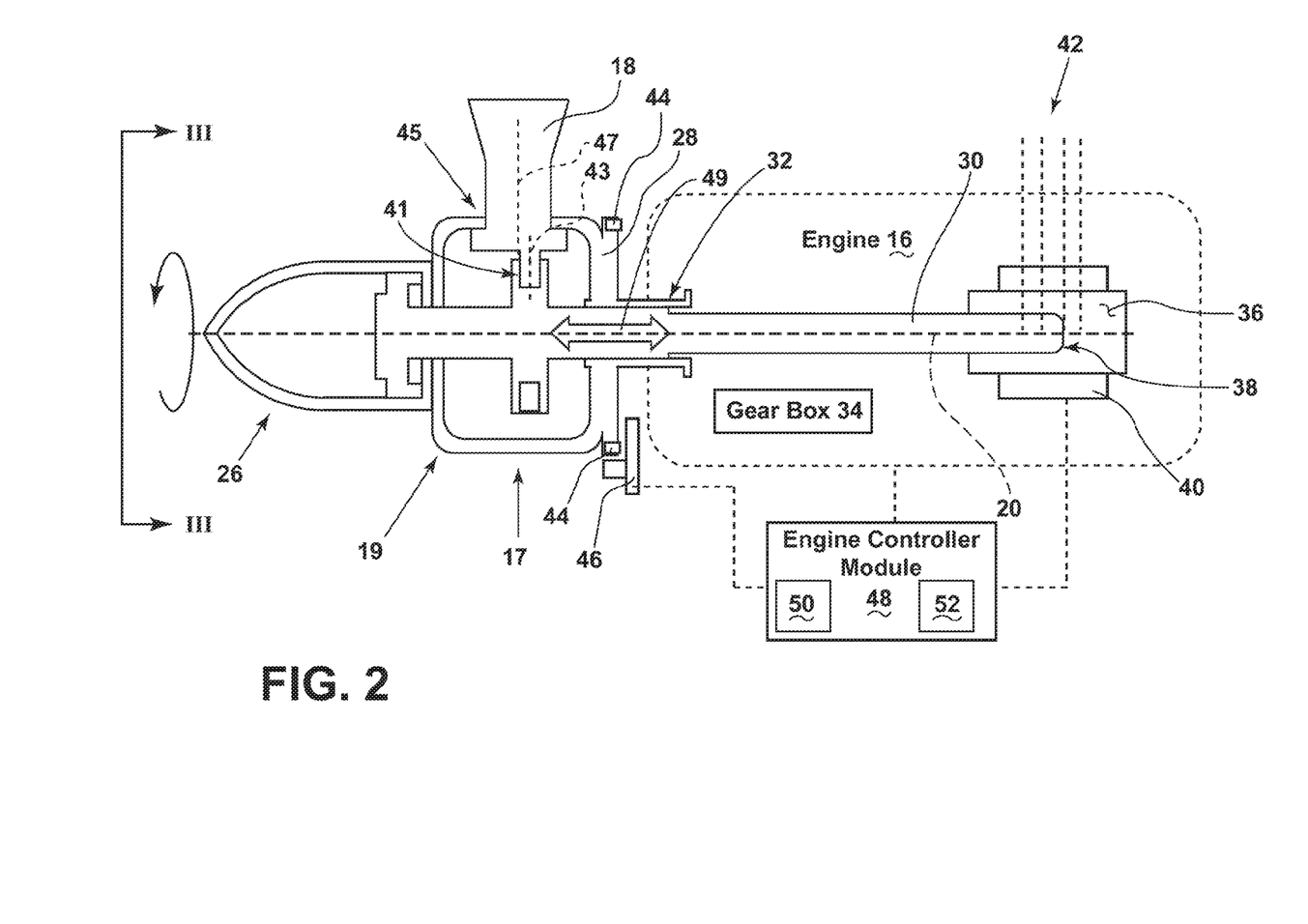
FIG. 2 is a schematic side view of an engine and propeller assembly in accordance with various aspects described herein and that can be included in the aircraft of FIG. 1.

FIG. 2 illustrates a schematic cross-sectional view of the propeller assembly 17 and engine 16. As shown, the propeller assembly 17 can include the propeller hub 19 having a pitch change cylinder 26, a hub back plate 28, a propeller transfer tube or beta tube 30, and a propeller shaft 32. Embodiments of the disclosure can be included wherein the beta tube 30 and propeller shaft 32 are combined, conjoined, or integrated. Alternatively, the beta tube 30 can be a subcomponent of the propeller shaft 32, or vice versa. The illustrated view demonstrates how the hub 19, hub back plate 28, beta tube 30, and propeller shaft 32 collectively rotate about the propeller assembly axis of rotation 20. Also shown, the engine 16 can include a propeller shaft 32 sized and optionally keyed to receive at least a portion of the beta tube 30 or transfer tube.

The engine 16 can optionally include a gearbox 34, and be arranged or configured to provide a driving force of rotational movement, optionally by way of the gearbox 34, to the propeller shaft 32 or directly to the propeller assembly 17 or the propeller shaft 32. In this sense, engine 16 or gearbox 34 operations provide a driving force to rotate the propeller assembly 17 about the propeller assembly axis of rotation 20. The engine 16 or gearbox 34 can further define a space or cavity 36 positioned and sized to receive a rear or aft end 38 of the beta tube 30. The engine 16 or gearbox 34 can include a first sensor, such as a transducer 40 positioned proximate to the cavity 36, for example in an enveloping circumference of the cavity 36, configured to detect, sense, or measure the position or depth of the aft end 38 of the beta tube 30 relative to the cavity 36, the transducer 40, the gearbox 34, or the engine 16.

In the illustrated embodiment, a set of example depth positions 42 axially spaced along the length of the cavity 36 demonstrate available, known, or predetermined depth positions of the aft end 38 of the beta tube 30 during engine 16 or propeller assembly 17 operation, relative to the cavity 36, transducer 40, or the engine 16. While four depth positions 42 are illustrated for brevity, the set of depth positions 42 can include additional or fewer discrete positions, or non-discrete positions, along the axial length of the cavity 36. The transducer 40 can further be configured to generate a signal indicative of the position or depth of the aft end 38 of the beta tube 30. In one example configuration, the transducer 40 can include a beta transducer. As used herein, the position or depth of the aft end 38 of the beta tube 30 can include an installed insertion position or depth, a "resting" or neutral position or depth, or a position or depth that varies or changes with propeller blade 18 pitch. Embodiments of the transducer 40 can be configured to generate a signal indicative of a change or variance of position or depth, an absolute value indicative of the position or depth, or a combination of a change and an absolute value of the aft end 38 of the beta tube 30.

As used herein, the term "radial" or "radially" denotes a relative distance from an axis of rotation, while the term "axial" or "axially" denotes a length or position along or parallel to the axis of rotation. For instance, the propeller assembly 17 extends in a longitudinal direction, or axial direction, along the propeller assembly axis of rotation 20, while the propeller blades 18 are radially spaced or aligned about the propeller assembly axis of rotation 20, and rotate about the propeller assembly axis of rotation 20.

The hub back plate 28 is positioned axially between the hub 19 and the engine 16, and is coupled with the propeller assembly 17 such that the hub back plate 28 and assembly 17 rotate in unison. The hub back plate 28 can include a set of targets 44 fixedly arranged radially about a common radius or common circumference of the hub back plate 28. The rotation of the propeller assembly 17 about the axis of rotation 20 also rotates the hub back plate 28 and set of targets 44. The engine 16 can include a second sensor, such as a target sensor 46, mounted to the engine 16 and positioned relative to the hub black plate 28 or the common radius or common circumference of the set of targets 44. In this sense, the rotation of the propeller assembly 17 rotates the set of targets 44 relative to the target sensor 46 such that the target sensor 46 can sense, measure, read, or identify the set of targets 44 or the passing of the set of targets 44 relative to the target sensor 46.

In one example configuration, the set of targets 44 can comprise magnets, or a magnetically permeable material and the target sensor 46 can comprise a magnet pick up unit, that is, a unit capable of or configured to sense a magnetic field or magnetic flux within a predetermined range relative to the target sensor 46. Additional examples of a set of targets 44 and a target sensor 46 configured or selected to sense, measure, read, or identify the set of targets 44 can be included in embodiments of the disclosure.

The propeller blades 18 are coupled with the hub 19 at a first portion 41 coupled with the propeller shaft 32 and rotatable about a first portion axis of rotation 43. The propeller blades 18 are further rotationally coupled with the hub 19 at a second portion 45, fixed relative to the first portion 41, and rotatable about a propeller blade pitch axis of rotation 47. Embodiments of the disclosure can include configurations wherein the first portion axis of rotation 43 is offset from the propeller blade pitch axis of rotation 47. The beta tube 30 is axially movable along the propeller assembly axis of rotation 20 relative to the engine 16, or hub 19 and pitch change cylinder 26. An example of the direction of the axial movement of the beta tube 30 is illustrated by arrow 49. It will be understood that the axial movement 49 of the beta tube 30 corresponds with a movement of the aft end 38 of the beta tube 30. The axial movement 49 of the beta tube 30 is indicated merely for understanding. The length and magnitude of the movement arrow 49 is merely one non-limited example of axial movement.

The axial movement 49 of the beta tube 30 along the propeller assembly axis of rotation 20 effects a corresponding axial movement of the first portion 41 of the propeller blade 18, including rotation of the first portion 41 about the first portion axis of rotation 43. Since the first portion 41 of the propeller blade 18 is fixed relative to the second portion 45, the offset configuration of the first portion axis of rotation 43 relative to the pitch axis of rotation 47 further effects a rotation of the propeller blades 18 about the pitch axis of rotation 47 at the second portion 45 of the blades 18. In this sense, the offset configuration of the axes of rotation 43, 47 and the axial movement 49 of the beta tube 30 can operably control the effective pitch of the propeller blades 18 relative to the hub 19 or the pitch change cylinder 26.

The illustrated embodiment also includes an electronic engine controller module 48. The engine controller module 48 can further include a processor 50 and memory 52. As shown, the engine controller module 48 or the processor 50 can be communicatively coupled with at least one of the engine 16, the target sensor 46, the transducer 40, or a combination thereof. In this sense, the engine controller module 48 or processor 50 can be configured to, respectively, control the effective operation of the engine 16, receive a signal indicative of the set of targets 44 passing the target sensor 46, or receive a signal indicative of the position or depth of the aft end 38 of the beta tube 30 relative to the cavity 36, the transducer 40, or the engine 16, as explained herein. The engine controller module 48 is schematically illustrated remote from the propeller assembly 17 and the engine 16. However, non-limiting embodiments of the disclosure can be included wherein the engine controller module 48 is integrated into, for example, the engine 16, another control system, a flight or aircraft computer, or control module located proximate to or remotely from the engine 16.

The memory 52 of the engine controller module 48 can store a set of operational control profiles or programs for configuring or operating the engine 16, the propeller assembly 17, or a combination thereof, such as coordinating the propeller assembly 17 with the engine 16. The memory 52 can include random access memory (RAM), read-only memory (ROM), flash memory, or one or more different types of portable electronic memory, such as discs, DVDs, CD-ROMs, etc., or any suitable combination of these types of memory. The engine controller module 48 can be operably coupled with the memory 52 such that one of the engine controller module 48 and the memory 52 can include all or a portion of a computer program having an executable instruction set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, engine controller module 48, or special purpose processing machine to perform a certain function or group of functions. In implementation, the functions can be converted to a computer program comprising a set of executable instructions, which can be executed by the processor 50.

Aircraft engines 16 can be configured to use, utilize, cater to, or coordinate with a set of different propeller blades 18 or propeller assemblies 17. In this sense, engines 16 can be configured or coordinated to operate with interchangeable propeller blades 18 or propeller assemblies 17. For example, different propeller assemblies 17 can include different characteristics, including, but not limited to operating characteristics, such as maximum or minimum pitch angle, propeller speed, or propeller phase relationship. As the individual or selected propeller assembly 17 characteristics can vary, the engine 16 or the engine controller module 48 can be configured to coordinate the engine's 16 capabilities with the selected propeller assembly 17. Embodiments of the disclosure include a system and method for coordinating at least one propeller blade 18 of a propeller assembly 17 with the engine 16 or the engine controller module 48 such that the engine controller module 48 is able to identify the propeller blade 18 or the propeller assembly 17, and adjust at least one performance characteristic of the engine 16. The adjusting of the at least one performance characteristic of the engine 16 operably or effectively matches, coordinates, configures, calibrates, or customizes the operation of the engine to the propeller blade 18 or propeller assembly 17. Stated another way, embodiments of the disclosure include a system and method wherein the engine 16 or engine controller module 48 can determine, is or can be made aware or, or "knows" which propeller blade 18 or propeller assembly 17 is installed.

During the initial installation of a propeller assembly 17 with the engine 16, the propeller assembly 17, propeller blades 18, hub 19, pitch change cylinder 26, beta tube 30, propeller shaft 32, or a combination thereof, is installed within or on the engine 16. The engine 16 or the engine controller module 48 can then operate an initial setup operation, executable program, method, or process. Examples of the initial setup operation can include, but are not limited to, axially moving 49 the beta tube 30 to effect a maximum pitch angle and a minimum pitch angle of the propeller blades. Additional examples of the initial setup operation can include, but are not limited to, at least partially rotating the propeller assembly 17 about the propeller assembly axis of rotation 20, for instance, by way of the engine 16 or gearbox 34 providing a driving force, or by way of an external force providing a driving force.

In a first embodiment of the disclosure, wherein the initial setup operations include the axial movement 49 of the beta tube 30, the transducer 40 can be utilized to measure or sense at least one unique parameter of the propeller assembly 17. For instance, the transducer 40 can measure or sense a unique parameter such as a depth position 42 of the aft end 38 of the beta tube 30, and send a signal representative of the at least one unique parameter to the engine controller module 48 or the processor 50. In one non-limiting example, the transducer 40 can measure or sense a maximum depth receivable of the aft end 38 in the cavity 36 corresponding to a maximum or minimum pitch angle of the propeller blade 18. In another non-limiting example, the transducer 40 can measure or sense a minimum depth receivable of the aft end 38 in the cavity corresponding to the other of the maximum or minimum pitch angle of the propeller blade 18. First embodiments of the disclosure can further include the transducer 40 measuring or sensing a set of depth positions 42, including, but not limited to the maximum depth, minimum depth, a set of depths therebetween, a change or variance of depths, or a combination thereof.

The first embodiment then provides the measured or sensed unique parameter or set of unique parameters of the propeller assembly 17 to the engine controller module 48 or processor 50, wherein the engine controller module 48 or processor 50 is configured to identify the propeller blades 18 or the propeller assembly 17 based on the unique parameter or set of unique parameters. The engine controller module 48 or processor 50 can then be configured to effectively match, coordinate, configure, calibrate, or customize the operation or performance of the engine 16 based on the identification of the propeller blades 18 or propeller assembly 17. For instance, the engine controller module 48 or processor 50 can determine or identify the propeller blades 18 of the propeller assembly 17 by comparing the at least one unique parameters, such as the depth measurements, to a lookup table stored in memory 52, wherein the lookup table includes a universe of unique propeller blades 18 or unique propeller assemblies 17. Alternatively, the lookup table can be stored in memory removed from or remote from the engine controller module 48, yet accessible by the engine controller module 48 or processor 50, for example, via an electronic network. For instance, the lookup table can be located in memory 52 remote from the aircraft.

In a second embodiment of the disclosure, wherein the initial setup operations include the rotational movement of the propeller blades 18 or propeller assembly 17, the target sensor 46 can be utilized to measure or sense at least one unique parameter of the propeller assembly 17, such as the set of targets 44 as they rotate relative to, or past the target sensor 46. For instance, the target sensor 46 can measure or sense a unique parameter such as the rotational passing of a target 44, or a series or set of targets 44, and send a signal representative of the at least one unique parameter to the engine controller module 48 or the processor 50.

In one non-limiting example, the target sensor 46 can measure or sense an indicative signal series, such as a pulse train, wherein the series or signal of indications can be keyed, matched, or coordinated with, or correspond with a unique propeller blade 18 or propeller assembly 17. In this sense, the set of targets 44 can be uniquely organized or arranged about the hub back plate 28 such that the passing of the uniquely organized or arranged set of targets 44 relative to the target sensor 46 can correspond with an encoding of the propeller blades 18 or propeller assembly 17.

The second embodiment then provides the measured or sensed unique parameter or set of unique parameters of the propeller assembly 17 to the engine controller module 48 or processor 50, wherein the engine controller module 48 or processor 50 is configured to identify the propeller blades 18 or the propeller assembly 17 based on the unique parameter or set of unique parameters. The engine controller module 48 or processor 50 can then be configured to effectively match, coordinate, configure, calibrate, or customize the operation or performance of the engine 16 based on the identification of the propeller blades 18 or propeller assembly 17.

Figure 3:
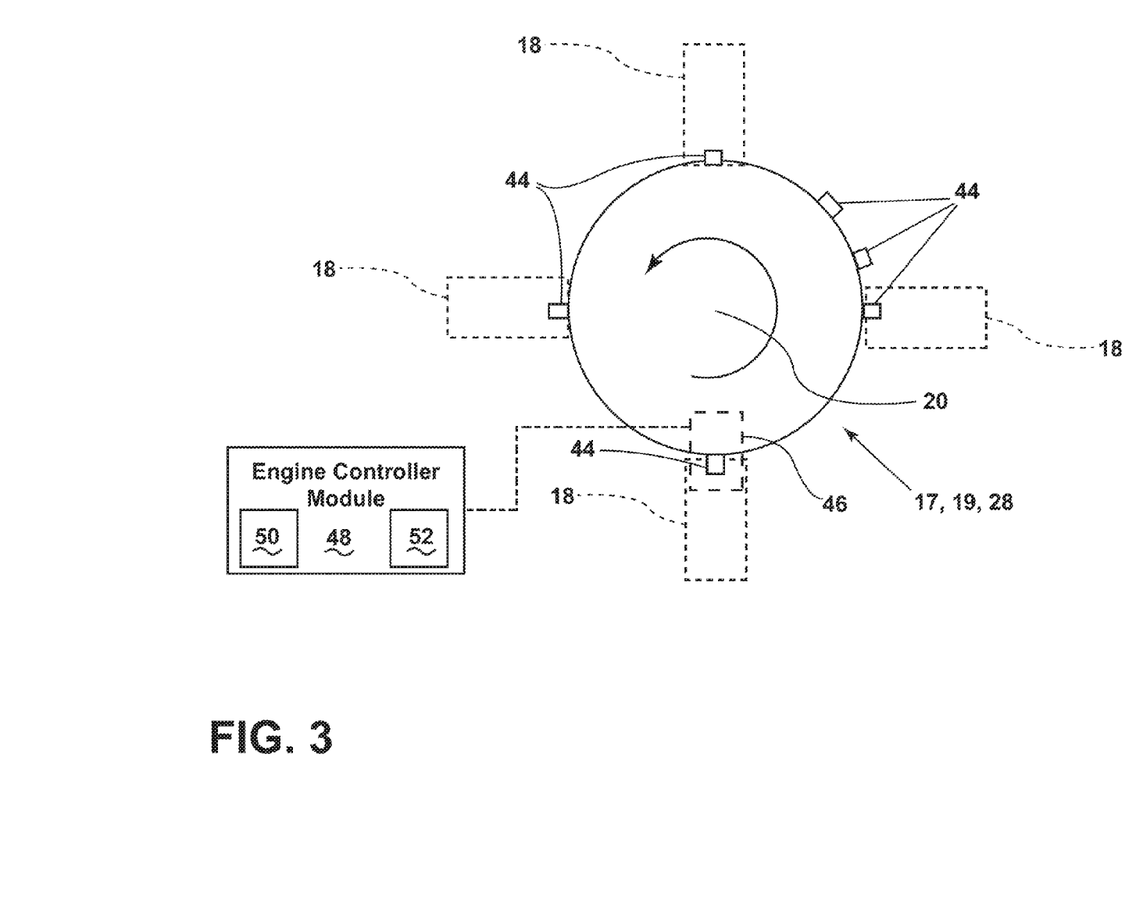
FIG. 3 is a schematic perspective view of the propeller assembly, taken along line III-III of FIG. 2, in accordance with various aspects described herein.

FIG. 3 illustrates a perspective rear-facing schematic view of the second embodiment from in front of the propeller assembly 17 wherein the propeller blades 18 have been shown in dotted outline for ease of understanding. As shown, the set of targets 44 uniquely arranged about a common radius or common circumference of the hub back plate 28 rotate with the hub back plate 28 relative to the target sensor 46.

The engine controller module 48 or processor 50 can determine or identify the propeller blades 18 or the propeller assembly 17 by comparing the at least one unique parameters, such as the arrangement of the set of targets 44 or the pulse train, to a lookup table stored in memory 52, wherein the lookup table includes a universe of unique propeller blades 18 or unique propeller assemblies 17. As previously explained, the lookup table can be stored in memory removed from or remote from the engine controller module 48, yet accessible by the engine controller module, for example, via an electronic network or remote from the aircraft.

Additional non-limiting configurations of the second embodiment can be included wherein, for instance, the set of targets 44 can be organized or arranged in a predetermined pattern to correspond with known propeller blades 18 or a known propeller assembly 17. In this example embodiment, the engine controller module 48 or processor 50 can determine or identify the propeller blades 18 or the propeller assembly 17 by matching the predetermined pattern with a corresponding lookup table entry.

In another non-limiting configuration of the second embodiment, the set of targets 44 can be organized or arranged in a encoded pattern that, when sensed by the target sensor 46 and provided to the engine controller module 48 or processor 50, can be processed or computed to determine or identify the propeller blade 18 or propeller assembly 17 without utilizing a lookup table. For example, the set of targets 44 can encode a binary instruction set to be executed by the processor 50, or a text-based indicator of the propeller blades 18 or propeller assembly 17, such as a serial or model number. Additional examples of an encoded message or communicative indicators beyond just a pulse train can be included.

Furthermore, the set of targets 44 can be independently configured or selected by size, shape, length, and the like, such that the passing of the independently configured or selected targets 44 generate different measurements or sensed values by the target sensor 46, such that the varying targets 44 can generate varying signals, further expanding the available encoding types, styles, or methods of the propeller blades 18 or propeller assembly 17.

The arrangement of the set of targets 44 can also include an indicator target 44 or subset of targets 44 to indicate the "start" of the encoding. Additionally, the encoded set of targets 44 can be duplicated or repeated over the radius or circumference of the hub back plate 28, for instance, to improve or increase the likelihood of correctly sensing, measuring, or "reading" the encoded pattern or message, or to provide sufficient counter weight for rotational balance of the propeller assembly 17. In another non-limiting embodiment of the disclosure, the hub back plate 28 can include unreadable, unmeasurable, or "dummy" targets arranged to provide sufficient counterweight for rotational balance of the "readable" set of targets 44 of the propeller assembly 17. Embodiments of the disclosure can further include an initial setup operation wherein the rotation of the propeller assembly 17 about the propeller assembly axis of rotation 20 is effected in a known or predetermined manner, such as a predetermined speed to enable or ensure an accurate sensing or measuring of the set of targets 44 by the target sensor 46. In yet another non-limiting embodiment of the disclosure, the set of targets 44 can be selectively or uniquely arranged on the one or more propeller blades 18, and wherein the target sensor 46 is positioned to sense the set of targets 44 as they rotate. In yet another non-limiting embodiment of the disclosure, a subset of targets 44 can be uniquely arranged or selectively positioned relative to a standard array of targets, wherein the standard array of targets are unrelated to identifying the propeller blades 18 or propeller assembly 17. Likewise, a subset of targets 44 can be uniquely arranged or selectively positioned relative to a standard array of targets in addition to selectively removing a subset of the standard array of targets to enable the encoding of the propeller blade 18 or propeller assembly 17.

Regardless of utilizing the aforementioned first embodiment, second embodiment, or combination thereof, the engine controller module 48 or processor 50 is configured to identify the propeller blade 18 or propeller assembly 17, and adjust the performance of the engine 16 based on the propeller blade 18 or propeller assembly 17.

Figure 4:
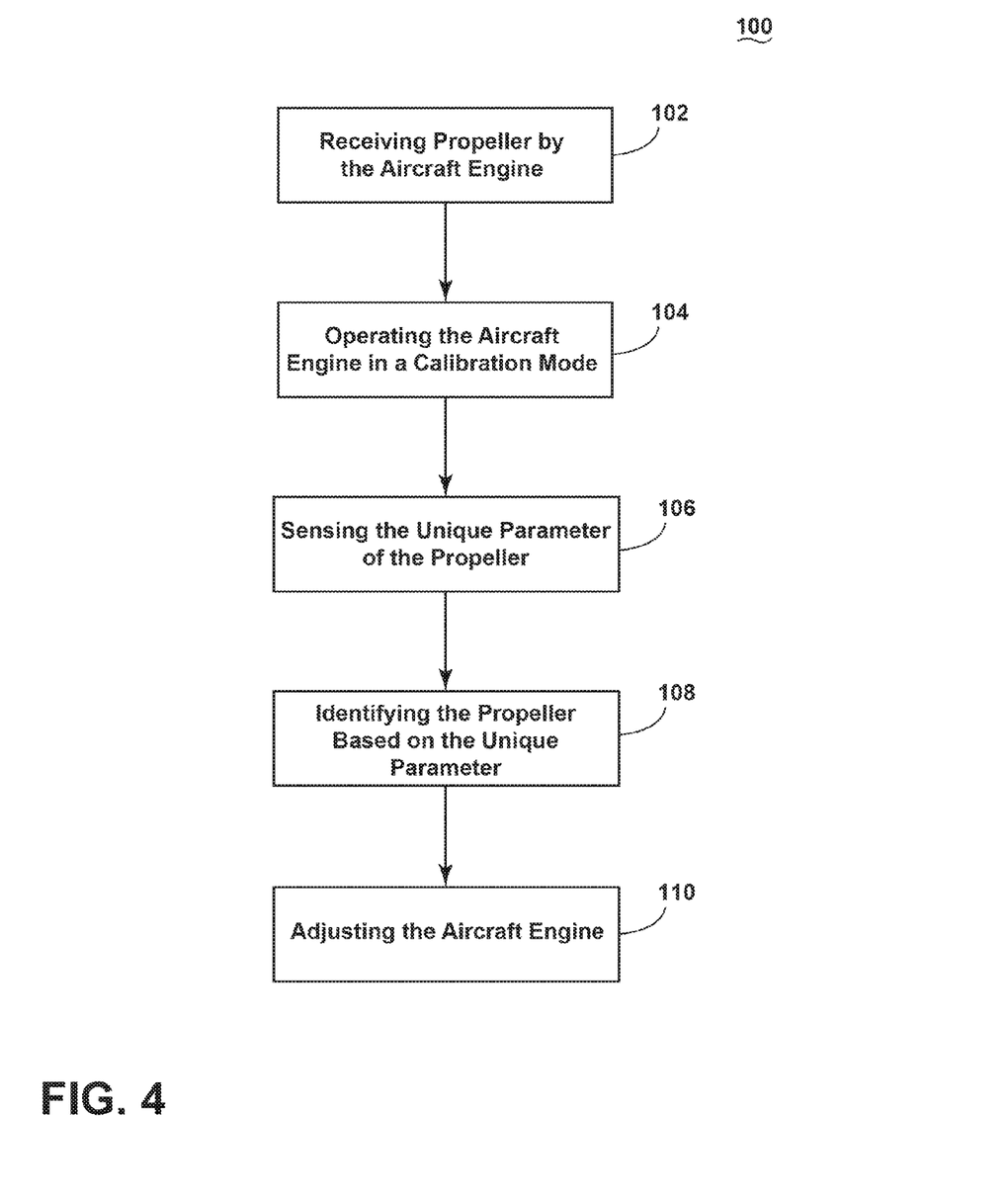
FIG. 4 is an exemplary flow chart diagram of demonstrating a method of coordinating the propeller with the engine controller module of FIG. 2, in accordance with various aspects described herein.

FIG. 4 illustrates a flow chart demonstrating a method 100 of coordinating a propeller blade 18 or propeller assembly 17 with an engine controller module 48 or an engine 16. The method 100 begins by receiving, by the aircraft engine 16, a propeller mounted to a beta tube 30 or propeller shaft 32 at a hub 19 and having a unique parameter of at least one of the beta tube 30, propeller shaft 32, or hub 19 at 102. The method 100 then proceeds to operating the aircraft engine 16, for example, in a calibration mode at 104. The method 100 can then sense, during the operating, by a sensor mounted to the aircraft engine 16 the unique parameter of the at least one of the beta tube 30, propeller shaft 32, or hub 19. Next, the method 100 identifies, by the engine controller module 48, the propeller based on the sensing of the unique parameter at 108. Finally, the method 100 adjusts at least one performance characteristic of the aircraft engine 16 at 110, wherein the adjusting coordinates the propeller with the aircraft engine 16, as explained herein.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure. For example, embodiments of the disclosure can include performing the above-described methods or operating the system during periods not including initial setup. Non-limiting examples of periods not including initial set up can include maintenance periods, continuous rotation periods, period rotation periods, normal engine startup periods, after a propeller blade pitch calibration period, or a combination thereof. Additionally, embodiments of the disclosure can include a default setting or adjusting of the engine or engine controller module, wherein, for example, when the method or system is unable to identify the propeller blades or propeller assembly, the method or system includes indicating an alert or error, or enabling the engine controller module to default to a generic propeller configuration. The generic propeller configuration can include a configuration appropriate or safe for all known or unknown propeller types or configurations.

The embodiments disclosed herein provide a system and method for coordinating a propeller blade 18 or propeller assembly 17 with an engine 16 or engine controller module 48. The technical effect of the above described embodiments enable identification of propeller types installed in the aircraft engine and automated configuration of the engine by adjusting performance characteristics to match the propeller. Elements of the present disclosure can provide or enable the automated identification of the propeller and configuration of the engine or engine control module specific to that propeller. The automated identification and adjustment can prevent or reduce user errors originating by users performing similar operations.

Additionally, by enabling multiple embodiments to perform a similar identifying and adjusting, a plurality of redundancies can be implemented to ensure propeller, engine, or engine controller module agreement, verification, or validation prior to operating an aircraft flight. The automated identifying and adjusting, along with the improved redundancy to ensure proper usage of the propeller and engine combination can result in reduced maintenance or non-flight time, and improved reliability of the propeller and engine combination. Reduced non-flight time and improved reliability can result in competitive advantages.

The above described embodiments allow an upgradable system wherein new propellers or engines can be incorporated in memory or executable programs as they are brought to market without having republish, or recreate user manuals corresponding with the new devices. The above described embodiments also allow for precise performance adjustments for the engine and propeller combination can be implemented, increasing the overall performance of the aircraft (e.g. reducing fuel consumption, reducing engine stress, increasing fuel range, etc.). Additionally, even in the event the propeller cannot be identified, the system and method can still adjust the engine or engine controller module to default to a predetermined or known configuration appropriate or safe for all known and unknown propellers.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

Further, it will be understood that many other possible embodiments and configurations in addition to those shown in the above figures are contemplated by the present disclosure.

This written description uses examples to disclose the embodiments, including the best mode, and also to enable any person skilled in the art to practice embodiments, including making and using any devices or systems and performing any incorporated methods. The patentable scope of the application is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for coordinating a propeller with an electronic engine controller module, the system comprising:
   an engine having an electronic engine controller module;
   a propeller mounted to a propeller shaft at a hub, wherein the propeller shaft is arranged to be received in the engine; and
   a sensor, connected to the electronic engine controller module, and configured to sense at least one unique parameter of the propeller and to send a signal representative of the at least one unique parameter to the electronic engine controller module when the propeller shaft is received in the engine and the propeller is rotated by the engine;
   wherein the electronic engine controller module is configured to identify the propeller and adjust performance of the engine to the propeller based on the signal.

2. The system of claim 1, wherein the sensor comprises at least one magnetic pick up unit and the at least one unique parameter comprises targets uniquely arranged on the propeller to come within range of the at least one magnetic pick up unit as the propeller rotates.

3. The system of claim 2, wherein the targets are uniquely arranged by selectively placing targets on one more blades of the propeller, selectively placing targets on a back plate of the hub, or by removing or adding targets to a standard array of targets.

4. The system of claim 2, wherein the targets generate a pulse train unique to the propeller in the magnetic pick up unit as the propeller rotates.

5. The system of claim 2, wherein identification of the propeller occurs during one of maintenance, continuous rotation, periodic rotation, during normal engine startup, or after a blade pitch calibration in the propeller.

6. The system of claim 1, wherein the sensor comprises at least one transducer fixed in the engine relative to the propeller shaft and the at least one unique parameter comprises a position of the shaft within the engine.

7. The system of claim 6, wherein the position includes at least one of an installed insertion depth and the at least one transducer detects the installed insertion depth, or an installed insertion depth that changes with changes in blade pitch and the at least one transducer detects the position changes.

8. The system of claim 6, wherein the electronic engine controller module is configured to compare the at least one unique parameter to a lookup table to identify the propeller, and the lookup table includes a universe of unique propellers.

9. The system of claim 1, wherein if the electronic engine controller module is unable to identify the propeller, the electronic engine controller will default to a generic configuration safe for all propellers.

10. A method for coordinating a propeller with an electronic engine controller module, the method comprising:
receiving, in an engine, a propeller mounted to a propeller shaft at a hub wherein at least one of the propeller shaft or hub has a unique parameter;
operating the engine in a calibration mode;
during the operating, sensing, by a sensor, the unique parameter of the at least one of the propeller shaft or hub;
identifying, by the engine controller module, the propeller based on the sensing of the unique parameter; and
adjusting at least one performance characteristic of the engine to coordinate the propeller with the engine.

11. The method of claim 10, wherein the sensing comprises sensing at least one of an installed insertion depth of the propeller shaft or a range of installed insertion depths related to changes in blade pitch.

12. The method of claim 10, wherein the sensing comprises sensing a set of targets arranged on the hub, wherein the operating the engine in the calibration mode rotates the set of targets relative to a target sensor.

13. The method of claim 10, wherein the identifying comprises comparing the unique parameter to a lookup table to identify the propeller, and the lookup table includes a universe of unique propellers.

14. A machine comprising:
an electronic controller module;
a propeller mounted to a propeller shaft at a hub, with the propeller shaft received in the machine; and
a sensor, connected to the electronic controller module, and configured to sense at least one unique parameter of the propeller and to send a signal representative of the at least one unique parameter to the electronic controller module when the propeller shaft is rotated relative to the machine;
wherein the electronic controller module is configured to identify the propeller and adjust performance of the machine to the propeller based on the signal.

15. The machine of claim 14, wherein the sensor comprises at least one magnetic pick up unit and the at least one unique parameter comprises targets uniquely arranged on the propeller to come within range of the at least one magnetic pick up unit as the propeller rotates.

16. The machine of claim 15, wherein the targets are uniquely arranged by selectively placing targets on one more blades of the propeller, selectively placing targets on a back plate of the hub, or by removing or adding targets to a standard array of targets.

17. The machine of claim 15, wherein the electronic controller module is configured to compare the at least one unique parameter to a lookup table to identify the propeller, and the lookup table includes a universe of unique propellers.

18. The machine of claim 15, wherein identification of the propeller occurs during one of maintenance, continuous rotation, periodic rotation, during normal startup, or after a blade pitch calibration in the propeller.

19. The machine of claim 14, wherein the sensor comprises at least one transducer fixed in the machine relative to the shaft and the at least one unique parameter comprises a position of the shaft within the machine.

20. The machine of claim 14, wherein the machine is one of a motor, generator, or engine.

* * * * *